United States Patent
Kondguli et al.

(10) Patent No.: US 11,321,806 B2
(45) Date of Patent: May 3, 2022

(54) ENHANCED EARLY COVERAGE DISCARD USING OPPORTUNISTIC BYPASSING AND DYNAMIC QUEUE RESIZING

(71) Applicant: Samsung Electronics Co., Ltd., Suwon-si (KR)

(72) Inventors: Sushant Kondguli, San Jose, CA (US); Nilanjan Goswami, Livermore, CA (US)

(73) Assignee: SAMSUNG ELECTRONICS CO., LTD.

( * ) Notice: Subject to any disclaimer, the term of this patent is extended or adjusted under 35 U.S.C. 154(b) by 0 days.

(21) Appl. No.: 17/098,318

(22) Filed: Nov. 13, 2020

(65) Prior Publication Data

US 2022/0028027 A1    Jan. 27, 2022

Related U.S. Application Data

(60) Provisional application No. 63/055,326, filed on Jul. 22, 2020.

(51) Int. Cl.
*G06T 1/20* (2006.01)
*G06T 1/60* (2006.01)

(52) U.S. Cl.
CPC . *G06T 1/20* (2013.01); *G06T 1/60* (2013.01)

(58) Field of Classification Search
CPC .............. G06T 1/20; G06T 1/60; G06T 15/40
USPC ........................................ 345/421, 501, 558
See application file for complete search history.

(56) References Cited

U.S. PATENT DOCUMENTS

| | | | |
|---|---|---|---|
| 8,228,328 B1* | 7/2012 | French | G06T 15/40 345/421 |
| 9,892,024 B2 | 2/2018 | Cerny et al. | |
| 9,953,455 B2 | 4/2018 | Lum et al. | |
| 10,192,280 B2 | 1/2019 | Saleh et al. | |
| 10,475,150 B2 | 11/2019 | Hux et al. | |
| 10,497,085 B2* | 12/2019 | Lee | G06T 7/50 |
| 2013/0135322 A1* | 5/2013 | Seetharamaiah | G06T 11/40 345/501 |
| 2013/0135341 A1* | 5/2013 | Seetharamaiah | G06T 15/005 345/619 |

(Continued)

OTHER PUBLICATIONS

Inoue, Yoshiaki, "Queueing Analysis of GPU-Based Inference Servers with Dynamic Batching: A Closed-Form Characterization," Computer Science, Performance, arXivLabs, Dec. 16, 2019, 17 pages.

*Primary Examiner* — Jacinta M Crawford
(74) *Attorney, Agent, or Firm* — Renaissance IP Law Group LLP

(57) ABSTRACT

A system and a method are disclosed that reduce primitive overdraw in a GPU. An occlusion index (OI) for a first tile of a batch of graphical data. In one embodiment, the first tile is bypassed from an early coverage discard (ECD) first-in, first-out (FIFO) if the OI for the first tile is less than a first threshold, otherwise the first tile is entered into the ECD FIFO. The first tile is also bypassed from the ECD FIFO if the OI for the first tile is greater than a second threshold that is greater than the first threshold. In another embodiment, a queue length is logically changed for the first tile in the ECD FIFO if the OI for the first tile is greater than the first threshold and less than or equal to a third threshold that is greater than the first threshold and less than the second threshold.

17 Claims, 9 Drawing Sheets

(56) References Cited

U.S. PATENT DOCUMENTS

| | | | |
|---|---|---|---|
| 2014/0198119 A1* | 7/2014 | Seetharamaiah | G06T 15/005 345/581 |
| 2015/0221127 A1* | 8/2015 | Howson | G06T 15/005 345/422 |
| 2017/0178386 A1* | 6/2017 | Redshaw | G06T 15/80 |
| 2018/0349315 A1* | 12/2018 | Heggelund | G06F 15/7882 |
| 2020/0184715 A1 | 6/2020 | Goswami et al. | |

* cited by examiner

ENHANCED EARLY COVERAGE DISCARD USING OPPORTUNISTIC BYPASSING AND DYNAMIC QUEUE RESIZING

CROSS-REFERENCE TO RELATED APPLICATION

This application claims the priority benefit under 35 U.S.C. § 119(e) of U.S. Provisional Application No. 63/055,326, filed on Jul. 22, 2020, the disclosure of which is incorporated herein by reference in its entirety.

TECHNICAL FIELD

The subject matter disclosed herein relates to graphic processing units (GPUs). More particularly, the subject matter disclosed herein relates to a method and a system that provides enhanced early coverage discard functionality using an opportunistic bypassing technique and/or a dynamic queue resizing technique.

BACKGROUND

GPUs are traditionally throughput devices that are not generally latency sensitive. Some GPU architectures, however, are latency sensitive. A GPU architecture implementing a post-raster hidden-surface-removal algorithm may involve holding coverage masks in a queue for overdraw erasure purposes, which may add additional latency in a pixel-processing pipeline. Situations in which overdraw may be a significant impact on delayed pixel shading may be detrimental to the performance of a GPU architecture especially if it is latency sensitive.

SUMMARY

An example embodiment provides a method to reduce overdraw of primitives in a graphics processing unit in which the method may include: determining, in a pipeline stage of the graphics processing unit, an occlusion index for a first tile of one or more tiles of a batch of graphical data; bypassing blocks of the first tile from an early coverage discard first-in, first-out memory in a depth unit of the graphics processing unit based on the occlusion index for the first tile being less than a first threshold value; and entering the blocks of the first tile into the early coverage discard first-in, first out memory based on the occlusion index for the first tile being greater than the first threshold value. In one embodiment, the occlusion index for the first tile may include an overdraw rate for the first tile based on a predetermined resolution of graphical data of the first tile. In another embodiment, the predetermined resolution of graphical data may include one of a sample level, a 2×2 block level, a quad level, an 8×8 block level, and a tile level. In still another embodiment, the first threshold value may be based on at least one of a batch size, a tile size, an early coverage discard first-in, first out memory, and a benchmark information for an application being processed by the graphics processing unit. In yet another embodiment, the method may further include bypassing the blocks of the first tile from the early coverage discard first-in-first out memory based on the occlusion index for the first tile being greater than a second threshold value, and based on the second threshold value being greater than the first threshold value.

An example embodiment provides a method to reduce overdraw of primitives in a graphics processing unit in which the method may include: determining, in a pipeline stage of the graphics processing unit, an occlusion index for a first tile of one or more tiles of a batch of graphical data; bypassing blocks of the first tile from an early coverage discard first-in, first out memory based on the occlusion index for the first tile being less than a first threshold value; and changing, in a depth unit, a queue length for the first tile in the early coverage discard first-in, first-out memory based on the occlusion index for the first tile being greater than the first threshold value and less than a second threshold value and based on the second threshold value being greater than the first threshold value. In one embodiment, the method may further include entering blocks of the first tile into the early coverage discard first-in, first out memory based on the occlusion index for the first tile being greater than the second threshold value. In another embodiment, the occlusion index for the first tile may include an overdraw rate for the first tile based on a predetermined resolution of graphical data of the first tile. In still another embodiment, entering blocks the first tile into the early coverage discard first-in, first-out memory may include entering one or more blocks of graphical data into the early coverage discard first-in, first-out memory by determining, in the depth unit, whether graphical data of a first block is occluded by a second block entered into the early coverage discard first-in, first-out memory; and indicating, by the depth unit, graphical data in the first block that is occluded by the second block.

An example embodiment provides a depth unit for a graphics processing unit that may include an early coverage discard first-in, first-out memory, and a comparator. The comparator may compare an occlusion index for a first tile against a first threshold value in which the first tile may include one of one or more tiles of a batch of graphical data. The depth unit may be configured to bypass blocks of the first tile from the early coverage discard first-in, first-out memory based on the occlusion index for the first tile being less than the first threshold value and enter the blocks of the first tile into the early coverage discard first-in, first-out memory based on the occlusion index for the first tile being greater than the first threshold value. In one embodiment, the comparator may be configured to compare the occlusion index for the first tile against a second threshold value that is greater than the first threshold value, and the depth unit may be configured to bypass blocks of the first tile from the early coverage discard first-in, first-out memory based on the occlusion index for the first tile being greater than a second threshold value. In another embodiment, the occlusion index for the first tile may include an overdraw rate for the first tile based on a predetermined resolution of graphical data of the first tile, and the predetermined resolution of graphical data may include one of a sample level, a 2×2 block level, a quad level, an 8×8 block level, and a tile level.

BRIEF DESCRIPTION OF THE DRAWING

In the following section, the aspects of the subject matter disclosed herein will be described with reference to exemplary embodiments illustrated in the figure, in which.

DETAILED DESCRIPTION

Figure 1:
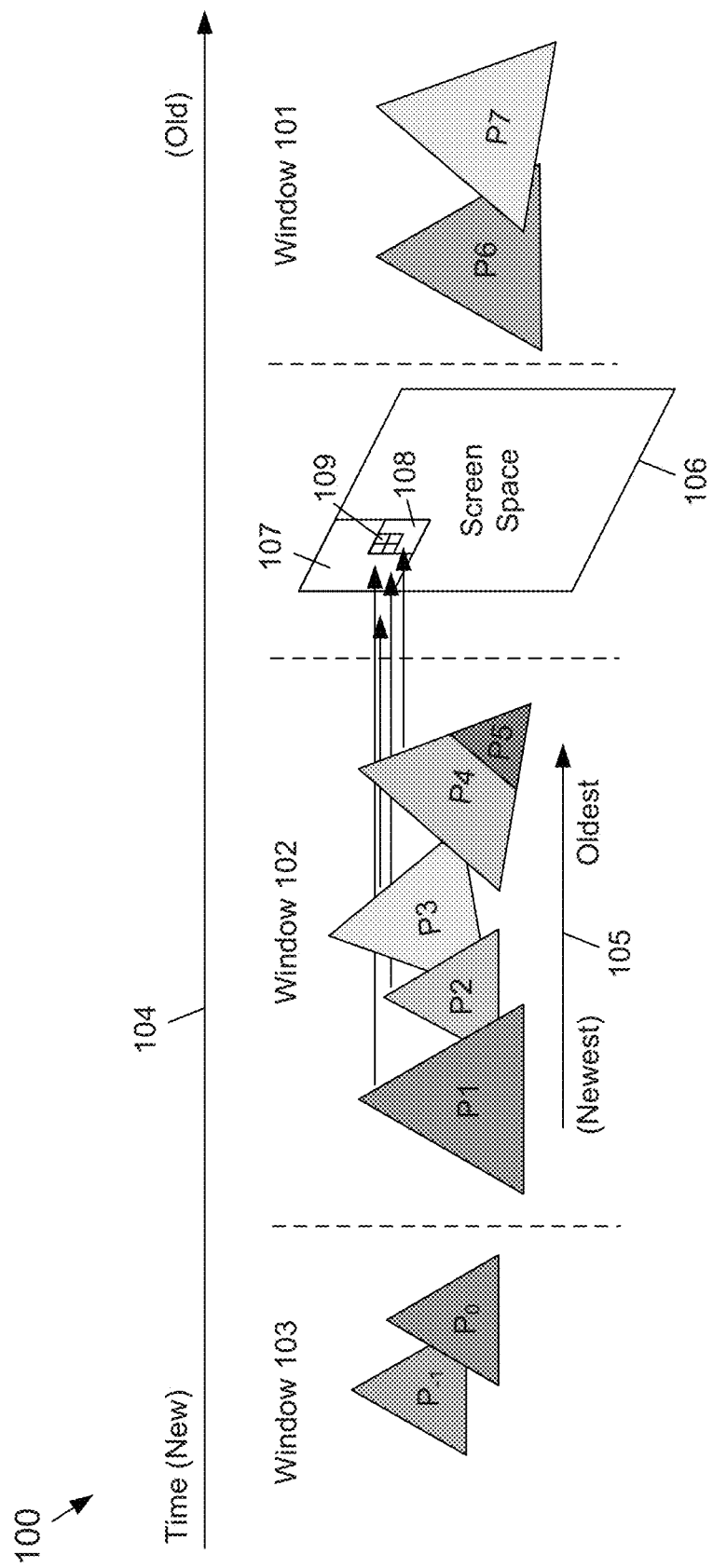
FIG. 1 conceptually depicts a hidden surface removal process that determines a "winner" primitive based on depth tests of the primitives contained in a window.

In the following detailed description, numerous specific details are set forth in order to provide a thorough understanding of the disclosure. It will be understood, however, by those skilled in the art that the disclosed aspects may be practiced without these specific details. In other instances, well-known methods, procedures, components and circuits have not been described in detail not to obscure the subject matter disclosed herein.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not be necessarily all referring to the same embodiment. Furthermore, the particular features, structures or characteristics may be combined in any suitable manner in one or more embodiments. In this regard, as used herein, the word "exemplary" means "serving as an example, instance, or illustration." Any embodiment described herein as "exemplary" is not to be construed as necessarily preferred or advantageous over other embodiments. Additionally, the particular features, structures, or characteristics may be combined in any suitable manner in one or more embodiments. Also, depending on the context of discussion herein, a singular term may include the corresponding plural forms and a plural term may include the corresponding singular form. Similarly, a hyphenated term (e.g., "two-dimensional," "pre-determined," "pixel-specific," etc.) may be occasionally interchangeably used with a corresponding non-hyphenated version (e.g., "two dimensional," "predetermined," "pixel specific," etc.), and a capitalized entry (e.g., "Counter Clock," "Row Select," "PIXOUT," etc.) may be interchangeably used with a corresponding non-capitalized version (e.g., "counter clock," "row select," "pixout," etc.). Such occasional interchangeable uses shall not be considered inconsistent with each other.

Also, depending on the context of discussion herein, a singular term may include the corresponding plural forms and a plural term may include the corresponding singular form. It is further noted that various figures (including component diagrams) shown and discussed herein are for illustrative purpose only, and are not drawn to scale. Similarly, various waveforms and timing diagrams are shown for illustrative purpose only. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing some example embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

It will be understood that when an element or layer is referred to as being on, "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "module" refers to any combination of software, firmware and/or hardware configured to provide the functionality described herein in connection with a module. For example, software may be embodied as a software package, code and/or instruction set or instructions, and the term "hardware," as used in any implementation described herein, may include, for example, singly or in any combination, an assembly, hardwired circuitry, programmable circuitry, state machine circuitry, and/or firmware that stores instructions executed by programmable circuitry. The modules may, collectively or individually, be embodied as circuitry that forms part of a larger system, for example, but not limited to, an integrated circuit (IC), system on-chip (SoC), an assembly, and so forth.

The subject matter disclosed herein provides a latency-tolerant post-raster hidden-surface-removal (HSR) process in which hidden surfaces may be opportunistically removed. Quads (or blocks) of tiles that have a relatively small estimated overdraw may opportunistically bypass an Early Coverage Discard (ECD) holding queue, thereby avoiding an overhead latency associated with the ECD queue. Additionally or alternatively, dynamic logical resizing of the ECD holding queue may be performed to avoid unnecessary latency for quads (or blocks) of tiles having a relatively large estimated overdraw, but are not required to remain in the holding queue for the entire duration of the holding queue.

In one embodiment, the subject matter disclosed herein provides a method and a system that opportunistically bypasses an ECD holding queue for quads (or blocks) of a batch of rasterized primitives that have no or insignificant pixel overdraw. Determination of insignificant overdraw may be done in an upstream block, such as in a binning unit, at a selected resolution of the primitive information. The subject matter disclosed herein also provides a dynamic resizing of an ECD holding queue to effectively provide an early drain of the ECD holding queue for primitives based on overdraw information gathered for a batch of tiles. Thus, the subject matter disclosed herein may be configured to operate at an operating point that has been optimized between overdraw erasure and overhead latency to provide an overall performance improvement and power saving for a GPU.

In one embodiment, the subject matter disclosed herein provides an improved hidden-surface-removal technique that may be used by either a latency tolerant or a latency intolerant hardware graphics pipeline. Additionally, the subject matter disclosed herein provides an ECD holding queue that has a reduced size (30-40% less), a reduced power consumption and a reduced latency for an ECD holding queue in comparison to a traditional ECD queue implementation.

An HSR process determines whether all or part a primitive is occluded by another primitive so that pixel shading for pixels that are occluded may be avoided. Another benefit provided by an HSR process may be that a Late Z determination process may be bypassed. FIG. 1 conceptually depicts an HSR process 100 that determines a "winner" primitive (i.e., a non-occluded primitive among overlapping primitives) based on depth tests of the primitives contained in a window. As depicted in FIG. 1, primitives P6 and P7 in window 101 have already passed through the HSR process 100, and primitives P1-P5 in window 102 are being processed. Window 103 includes primitives $P_{-1}$ and $P_0$, which will be processed when processing of window 102 is complete.

HSR relative processing time is depicted by a timeline 104 in which processed windows (i.e., oldest windows) appear to the right. Windows that are yet to the processed (i.e., newest windows) appear toward the left of the timeline 104. Window(s) currently being processed appear towards the middle of the timeline 104. Similarly, a processing HSR timeline 105 for primitives in a window being processed is depicted in the same manner with oldest primitives toward the right and newest primitives toward the left.

A screen space 106 on which rasterized primitives P1-P5 of window 102 will be displayed after rendering is also depicted for visualization purposes. The arrows extending from the primitives P1-P5 toward the screen space 106 are intended to indicate that the primitives P1-P5 will be rendered for display in the region of the screen space 106 indicated. It should be noted that the depicted screen space 106 is not part of the window 101 or the window 102. The screen space 106 may be divided into one or more batches 107, of which only one batch 107 is indicated. The batches 107 may be further divided into tiles 108, and each tile 108 may be divided into, for example, quads 109 in which a quad is a 4×4 block of samples (pixels). That is, a tile 108 is made up of quads (or blocks) 109, and a batch 107 is made up of tiles 108. It should be understood that a block may be a different size than a quad, and that the term "block" may be used herein to indicate a generic size of samples (pixels) being processed.

An on-chip holding buffer (not shown) may be used to hold pixel coverage and primitive information for a set of primitives in a window being HSR processed. The attributes may also be stored in an on-chip memory (not shown) for an entire window of primitives. When all of the pixels of the primitive(s) in the holding buffer for the window have been processed, the pixels of the primitive(s) may be drained, or sent, to a next stage for further processing. There is an overhead for the HSR process that involves buffering the primitives, managing the buffer, and updating the coverage information as winner primitives are determined. Accordingly, there is a tradeoff between the HSR overhead on one hand, and on the other hand, a reduction in pixel shading processing.

Figure 2:
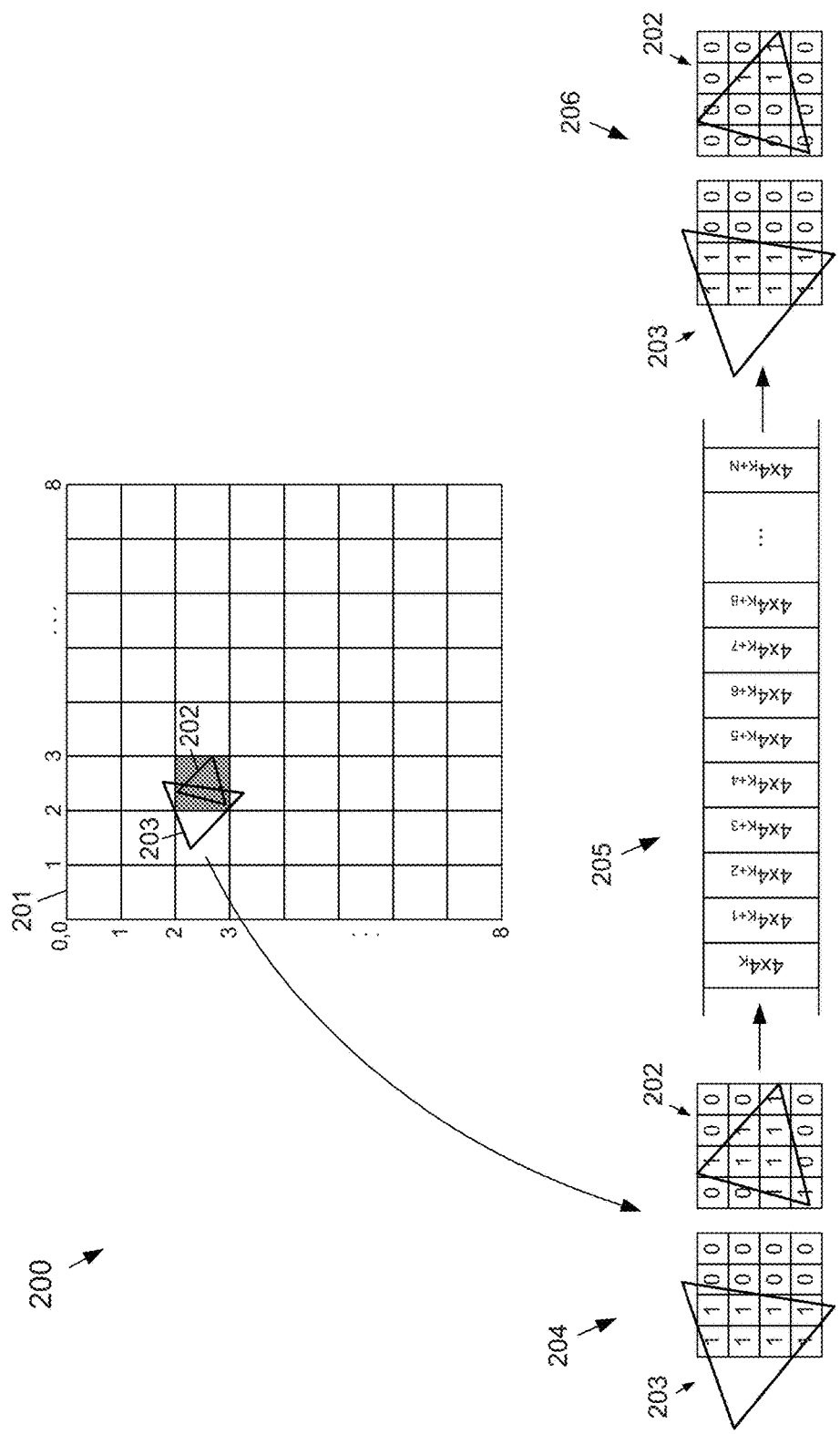
FIG. 2 conceptually depicts an example early coverage discard process that may be part of a hidden surface removal process, such as the hidden surface removal process in FIG. 1.

FIG. 2 conceptually depicts an example ECD process 200 that may be part of an HSR process, such as the HSR process 100 in FIG. 1. In one embodiment, the ECD process 200 may be part of or may include a post-rasterization process (also called an overdraw-removal method). One aspect of the ECD process 200 includes holding rasterized coverages in a first-in, first-out (FIFO) buffer, or memory, to delay pixel shading (also referred to as Deferred Rendering in hardware) so that overlapping coverages may be determined and erased to remove quads of occluded primitives. Without an ECD process, it is possible to have multiple primitives shading the same sample. Delaying pixel shading using the ECD FIFO results in each sample being shaded by at most one primitive per batch.

In FIG. 2, an 8×8 Partial Tile Coverage Map (TCM) is shown at 201. An example primitive 202 and an example primitive 203 are shown in the partial TCM 201. Using a resolution at a quad level (i.e., 4×4 sample block) for this example, the primitive 203 occludes the primitive 202 in the quad at a 2,2 location in the TCM 201, which is indicated by a gray fill. Other block-size resolutions may be used. For example, individual samples (i.e., pixel level resolution) may be used for determining whether there is any occlusion of a primitive. Another example may use a resolution of 8×8 blocks. The finer the size of the resolution translates into a higher degree of accuracy for an ECD process.

After a depth test has been performed on the primitives 202 and 203 in, for example, a depth block (not shown), masks for the primitives 202 and 203 are shown at 204. A "1" value in a mask indicates that a primitive occupies, or covers, the corresponding sample in the block. A "0" value in a mask indicates that a primitive does not occupy the corresponding sample in the block.

As the quad blocks are received from the output of the depth test, the quad blocks are generally entered into a FIFO, or holding queue, 205. Quads are represented in the FIFO 205 in FIG. 2 as, for example, $4\times4_K$, and so on. In an embodiment, the FIFO 205 may be configured to receive blocks that are a size that is different from a quad. In one embodiment, the FIFO 205 may be referred to as a Block Coverage Information FIFO. The FIFO 205 may be any suitable length for determining coverage. For example, in one embodiment, the FIFO 205 may be 128 locations long. That is, the FIFO 205 may be large enough to receive 128 blocks. As the quads proceed through the FIFO 205, they are evaluated at least in part based on the results of the depth test. Values of elements in the masks of "older" primitives that are occluded by "newer" primitives are changed from "1" to "0". The terms "older" and "new" reflect relative positions in the FIFO 205. That is, an "older" primitive has been entered into the FIFO 205 prior to a "newer" primitive.

The masks for the output of the FIFO 205 are shown at 206 for the primitives 202 and 203. Values of the mask for the primitive 202 that are occluded by the primitive 203 have been changed by the ECD process 200 to "0" indicating that the coverage has erased the occluded part of the primitive 202. Based on the mask for primitive 202, shading of the samples of the primitive 202 may be avoided, thereby saving at least power.

While the example ECD process depicted in FIG. 2 is effective for avoiding shading of blocks that are occluded, partial batching of primitives during binning may reduce the effectiveness of the ECD process. To reduce an adverse impact of ECD effectiveness caused by partial batching, the size of the FIFO 205 may be increased so that more blocks may be evaluated for occlusion. As the size of the FIFO increases, however, the size of the on-chip storage in a GPU also increases. Additionally, as the size of the FIFO increases, the delay between the time that a block is entered into the FIFO and the time that the block exits increases, thereby increasing the latency before the blocks may be rendered.

Increased on-chip storage and increased latency may be acceptable if there is enough overdraw in the blocks. In some cases, however, there may be batches that have little or no occlusion, in which case no benefit would be provided by an ECD process. To take advantage of a situation in which a tile has little or no occlusion, the subject matter disclosed herein determines whether to enter blocks of tiles of a batch into an ECD FIFO or to have the blocks bypass the ECD FIFO based on an estimated amount of occlusion in the batch. Blocks that bypass the ECD FIFO may be sent for rendering without the latency associated with the ECD FIFO. Bypassing of the ECD FIFO may also be considered to be a recovery of the overhead latency associated with the ECD process. Further, the attributes associated with a block that bypasses the ECD FIFO may also advance, thereby freeing up the resources being consumed by the attributes.

An Occlusion Index (OI) may be used that indicates an estimated overdraw rate of each tile in each batch. A batch may include multiple tiles in which a number of the tiles may cover the same screen space. For example, if three tiles for the same screen space each contain a primitive and one of the primitives that overlaps a primitive in each the other two tiles, the OI for each of the three tiles is 3 because there are three primitives for that screen space. The OI may count the number of primitives per batch, the number of primitives per tile or the number of primitives per quad, etc. Each tile can have its own OI. For opportunistic bypassing, an individual tile can be bypassed if the ECD FIFO is empty, otherwise all of the tiles in the ECD FIFO will have to be bypassed before a tile nearer the input to the FIFO may be bypassed. For dynamic queue resizing, the queue size may be changed for each tile and across batches. Note, that an actual shader overdraw value is different from the OI because the shader overdraw is finer than the OI. The OI may be determined in, for example, a binning unit. Alternatively, the OI may be determined in a pipeline stage, such as a depth block. Note that a block can only bypass the ECD FIFO when the FIFO is empty, otherwise it has to wait for the FIFO to empty before it can be bypassed.

The OI may be determined at a selected level of accuracy. For example, the OI may be determined at a sample (pixel) level, 2×2 block level, a quad level, an 8×8 block level, or at a tile level keeping in mind that there may be a trade-off between the selected level of accuracy, and a Power/Performance/Area (PPA) boost and computational overhead associated with the ECD process. As used herein, the term PPA boost refers to a performance increase as a result of a reduction of power consumption and/or chip area. An OI determined at a finer level may be accordingly more accurate, but at the trade-off of increased power consumption, reduced performance and increased chip area.

The OI may be used in an opportunistic bypassing technique and/or a dynamic queue resizing technique to enhance the effectiveness of an ECD process. The opportunistic bypassing technique bypasses tiles of a batch from an ECD FIFO based on the value of OI with respect to a floor threshold $O_{floor}$. The dynamic queue resizing technique changes the size of the ECD queue for tiles of a batch based on the value of the OI with respect to the floor threshold $O_{floor}$. The $O_{floor}$ threshold may be determined based on a batch size, a tile size, an ECD FIFO size, and/or benchmark information for an application being processed. The $O_{floor}$ threshold may be static during running of an application.

Another threshold that may be used by opportunistic bypassing technique is referred to herein as a ceiling threshold $O_{ceil}$. Tiles having an OI greater than $O_{ceil}$ likely will not have a coverage erasure PPA boost because the ECD FIFO is finite and the architecture latency may be fixed. As such, a PPA boost may be obtained for tiles having an OI up to the ceiling threshold $O_{ceil}$. If the OI for a tile is greater than the $O_{ceil}$, performance may be degraded based on the ECD latency dominating an ECD quad erasure PPA gain. The degradation may be a function of a bin size, a tile size, a batch size, an ECD FIFO size, benchmark information for an application being processed, and/or an architecture latency sensitivity of the GPU. The $O_{ceil}$ may also or alternatively be determined statistically. Thus, coverage will be bypassed if the OI is less than $O_{floor}$ and greater than $O_{ceil}$. Bypassing tiles that have an OI greater than $O_{ceil}$ tends to act like a flushing mechanism for the ECD FIFO because the ECD FIFO may already be filled with blocks, and bypassing tiles having an OI greater than $O_{ceil}$ tends to reduce the number of blocks entered into the ECD FIFO, thereby allowing the ECD FIFO to empty. Note that quads can only be bypassed when the ECD FIFO is empty. If it is determined that a quad needs to be bypassed, the quad will wait for the FIFO to empty before advancing to the next stage of the pipeline.

The dynamic resizing (DR) technique logically resizes an ECD FIFO based on the OI value for a tile being equal to or greater than the $O_{floor}$ threshold, but less than a threshold referred to herein as $O_{ceil-n}$. The "n" in the threshold $O_{ceil-n}$ may be any number depending on how many dynamic resizing design ranges are used by the system. If, for example, an OI value for a tile is equal to or greater than $O_{floor}$, but not greater than $O_{ceil-n}$, the tile may not need a large ECD FIFO, so the FIFO size may be logically reduced to improve performance by having the tile blocks exit the FIFO earlier.

The opportunistic bypassing technique and the dynamic queue resizing technique may be used separately or may be used together. With opportunistic bypassing, tiles that may bypass the ECD FIFO do so, and with dynamic queuing resizing, the logical size of the ECD FIFO may be reduced as tiles of a block enter the FIFO so that the tiles do not wait the full length of the FIFO, and may be released earlier for further processing.

Figure 3:
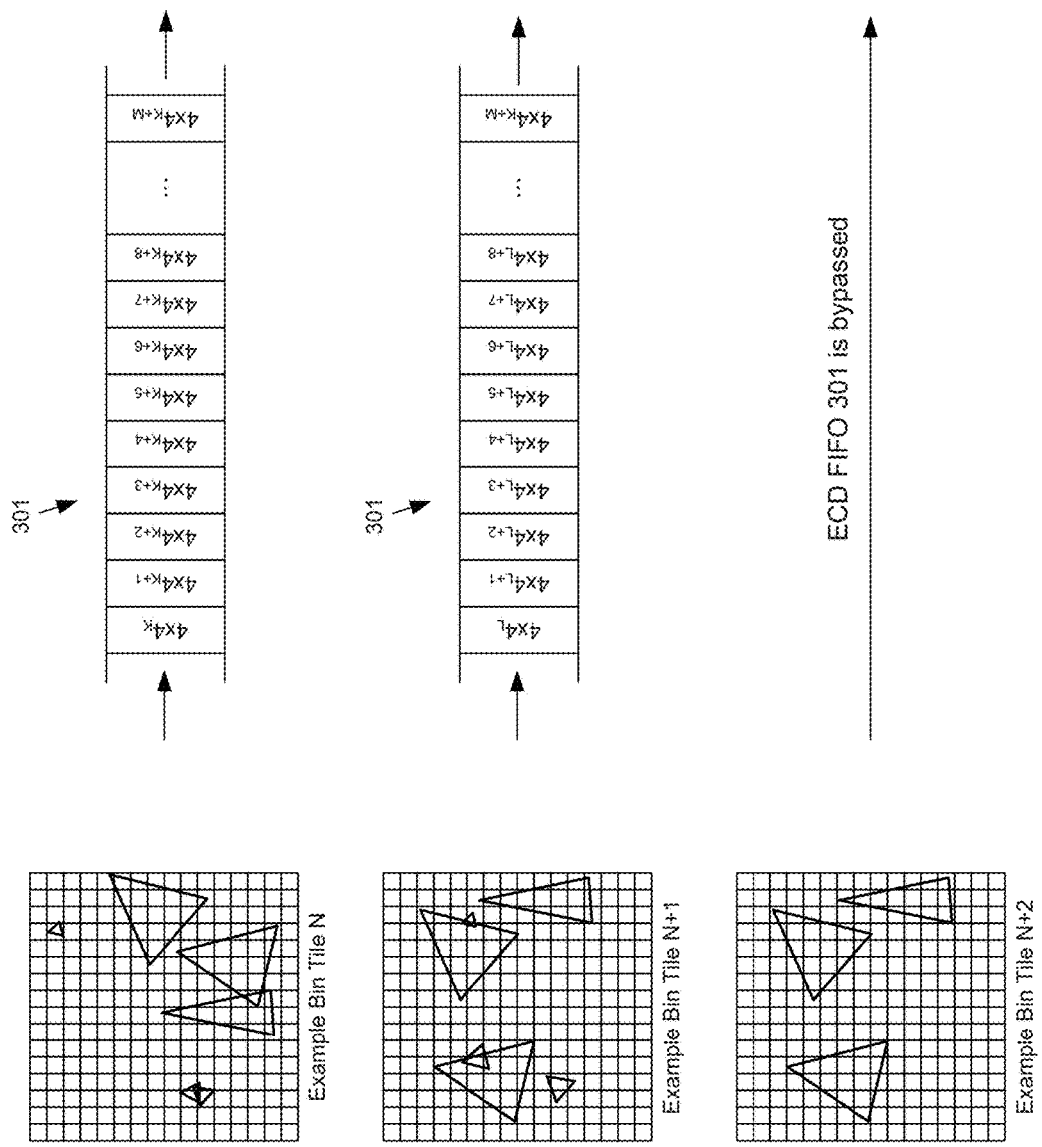
FIG. 3 depicts an example of an opportunistic bypass process according to the subject matter disclosed herein.

FIG. 3 depicts an example of an opportunistic bypass process according to the subject matter disclosed herein. In the top row of FIG. 3, an example bin tile N includes a number of primitives (depicted as triangles) of which some of the primitives have surfaces that are occluded. For the example of the top row, the bin tile N has an OI that is greater than an $O_{floor}$ threshold that has been determined for this example. The blocks (in this case quads) are entered into an ECD FIFO 301, and the ECD process is performed on the example bin tile N before the quads are sent to the next unit for further processing.

In the middle row of FIG. 3, another example bin tile N+1 includes a number of primitives of which some of the primitives have surfaces that are occluded. For the example of the middle row, the bin tile N+1 has an OI that is greater than an $O_{floor}$ threshold that has been determined for this example. The blocks (in this case quads) are entered into an ECD FIFO 301, and the ECD process (and the ECD FIFO 301) is performed on the example bin tile N before the quads are sent to the next unit for further processing.

In the bottom row of FIG. 3, an example bin tile N+2 includes a number of primitives of which none of the primitives has a surface that is occluded. For the example of the bottom row, the bin tile N+1 has an OI that is less than an $O_{floor}$ threshold that has been determined for this example. The example bin tile N+2 is bypassed from the ECD FIFO and sent to the next unit for further processing.

Figure 4:
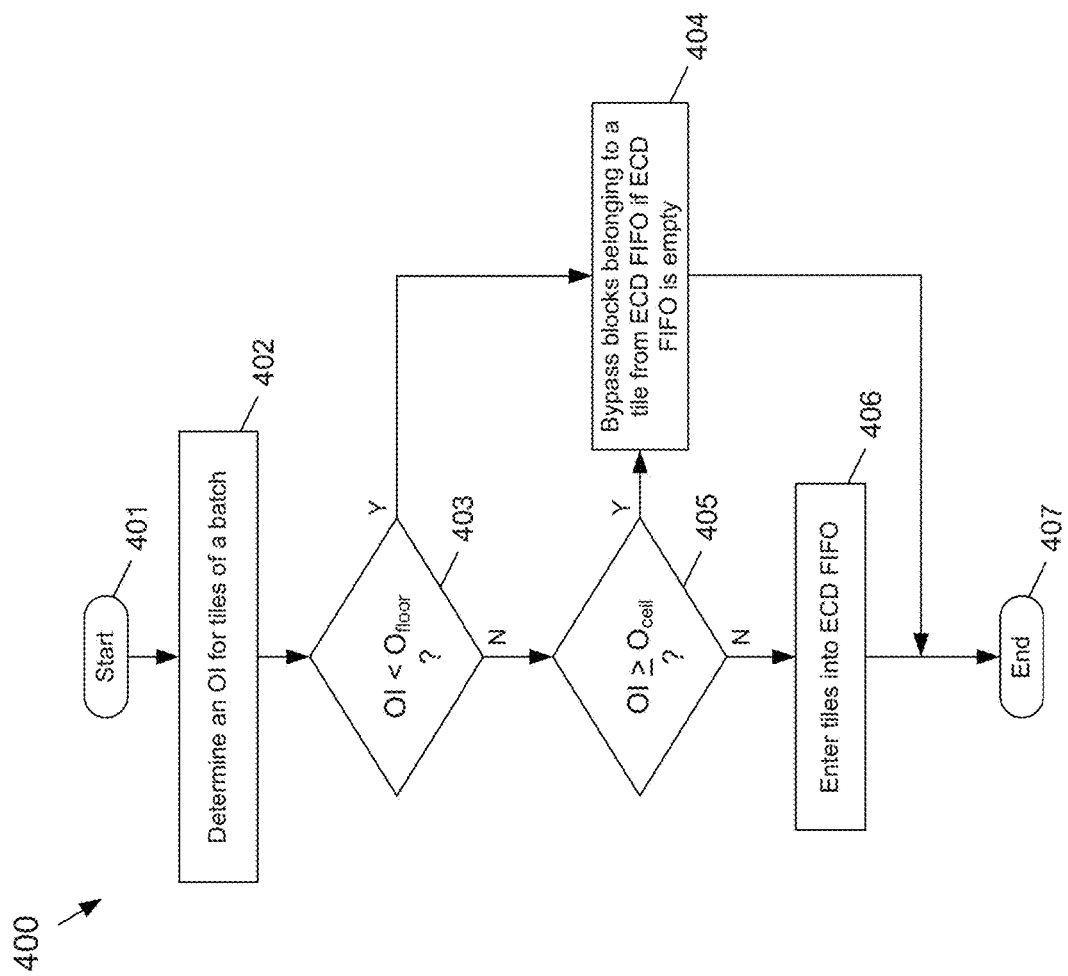
FIG. 4 is a flowchart for an example embodiment of an opportunistic bypassing technique according to the subject matter disclosed herein.

FIG. 4 is a flowchart for an example embodiment of an opportunistic bypassing technique 400 according to the subject matter disclosed herein. The process starts at 401. At 402, an OI is determined for tiles of a batch. At 403, it is determined whether the OI for the tiles of the batch are less than an $O_{floor}$ threshold. If so, flow continues to 404 where the blocks (or quads) belonging to a tile are bypassed from an ECD FIFO when the ECD FIFO is empty. Flow continues to 407 where the process for the batch ends, but may be repeated for additional batches. If, at 403, it is determined that the OI is not less than the $O_{floor}$ threshold, flow continues to 405 where it is determined whether the OI for the tiles of the batch is greater than an $O_{ceil}$ threshold. If so, flow continues to 404 where the blocks (or quads) belonging to a tile are bypassed from an ECD FIFO when the ECD FIFO is empty. Flow continues to 407 where the process for the batch ends, but may be repeated for additional batches. If, at 405, it is determined that the OI is not greater than the $O_{ceil}$ threshold, flow continues to 406 where the blocks (or quads) of the batch are entered into the ECD FIFO. Flow continues to 407 where the process for the batch ends, but may be repeated for additional batches.

An ECD system may be designed for a worst case HSR PPA gain for a fixed queue size. Tiles having a large OI value may not need a large queue in which case dynamic queue resizing may be used to improve performance with a same amount of quad erasure, but with a shorter queue delay. In one embodiment, the dynamic queue resizing may be adjusted for different tile sizes, batch sizes, etc.

Figure 5:
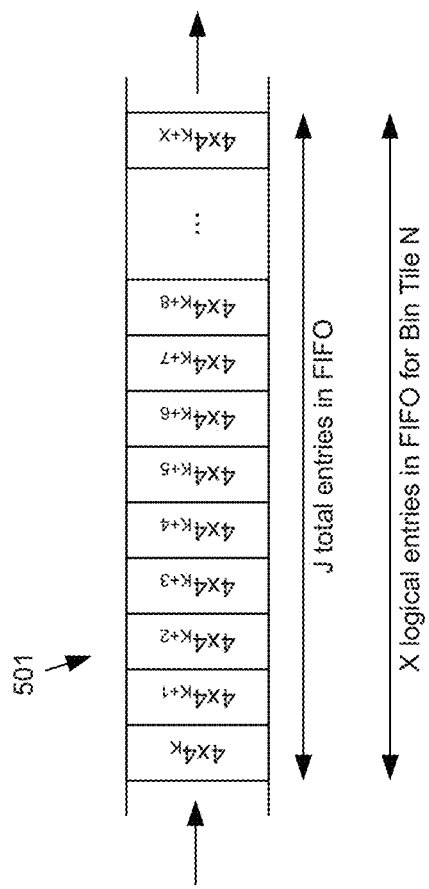
FIG. 5 depicts an example of dynamic queue resizing of an early coverage discard first-in, first-out memory according to the subject matter disclosed herein.
Figure 5:
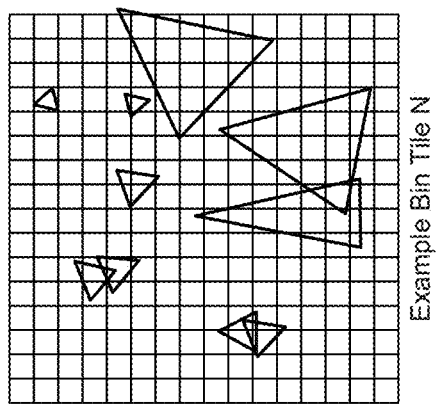

FIG. 5 depicts an example of dynamic queue resizing of an ECD FIFO according to the subject matter disclosed herein. FIG. 5 shows an example bin tile N that includes a number of primitives (depicted as triangles) of which only a few of the primitives have surfaces that are occluded. The OI value for the example bin tile N in FIG. 5 is greater than an $O_{floor}$ threshold for this example, but less than an $O_{ceil-n}$ threshold for this example. Consequently, an ECD FIFO 501, which has a total FIFO size of J, is logically resized for the bin tile N to have X logical entries (i.e., X blocks) in the FIFO 501. The blocks (in this case quads) are entered into the ECD FIFO 501, and the ECD process is performed on the example bin tile N as the quads remain in the ECD FIFO 501 for X entries before the quads are sent to the next unit for further processing.

It should be noted that early ejection is different from dynamic queue resizing. Early ejection may occur when a tile has no more quads (or blocks) that are to be entered into an ECD FIFO and the FIFO is not full. In contrast to early ejection, dynamic queue resizing occurs when an OI value for a tile is used to logically shorten the ECD holding queue for tiles of a batch. Early ejection, however, may occur due to a dynamic queue resizing.

Figure 6:
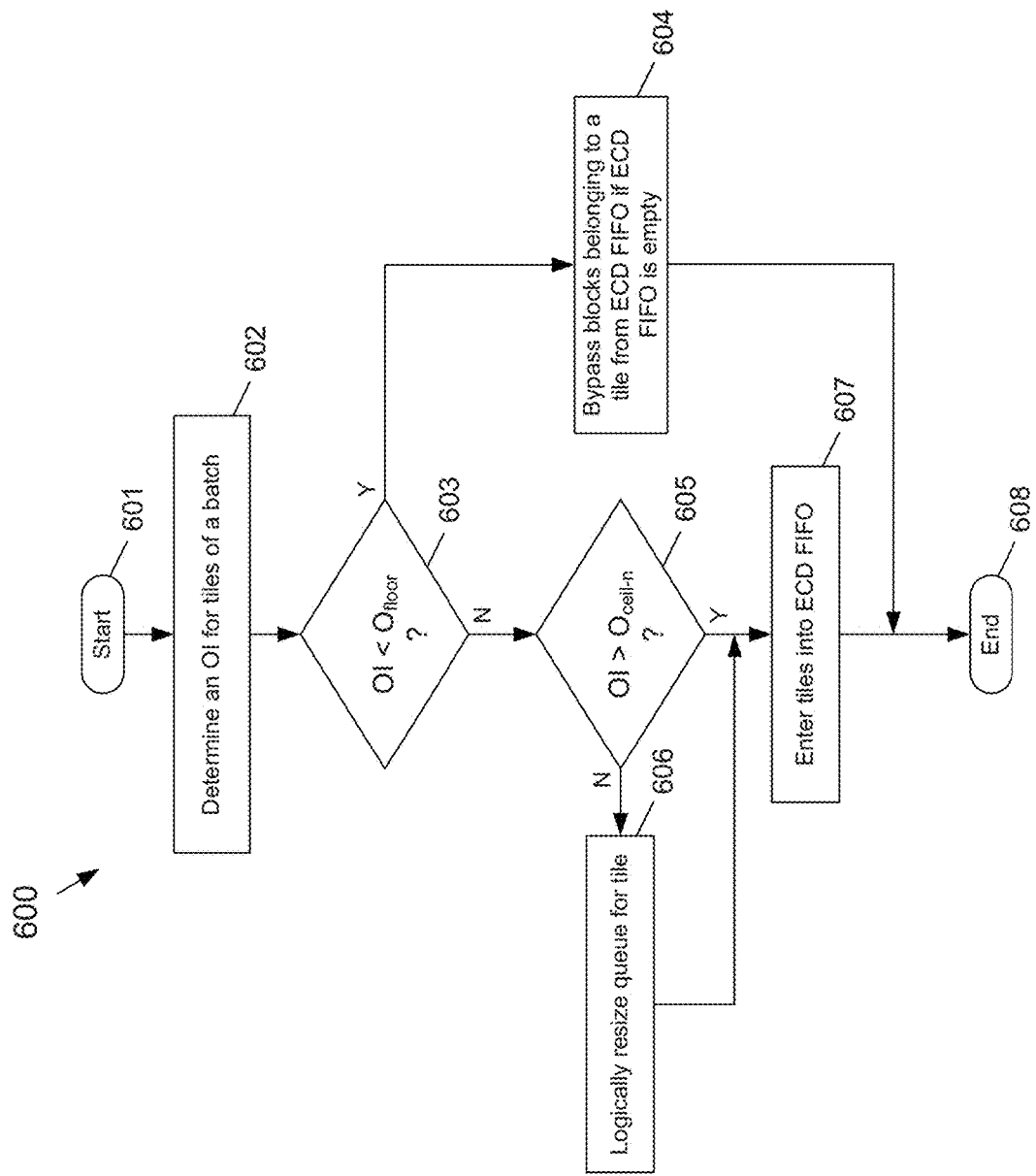
FIG. 6 is a flowchart for an example embodiment of a dynamic resizing technique for an early coverage discard first-in, first-out memory according to the subject matter disclosed herein.

FIG. 6 is a flowchart for an example embodiment of a dynamic resizing of an ECD FIFO technique 600 according to the subject matter disclosed herein. The process starts at 601. At 602, an OI is determined for tiles of a batch. At 603, it is determined whether the OI for the tiles of the batch are less than an $O_{floor}$ threshold. If so, flow continues to 604 where the blocks (or quads) belonging to a tile are bypassed from an ECD FIFO when the ECD FIFO is empty. Flow continues to 608 where the process for the batch ends, but may be repeated for additional batches. If, at 603, it is determined that the OI is not less than to the $O_{floor}$ threshold, flow continues to 605 where it is determined whether the OI for the tiles of the batch is greater than an $O_{ceil-n}$ threshold. If not, flow continues to 606 where the ECD queue is logically resized for the tiles of the batch. After 606, flow continues to 607 where the blocks still enter the ECD FIFO. Flow continues to 608 where the process for the batch ends, but may be repeated for additional batches. If, at 605, it is determined that the OI is greater than the OAR threshold, flow continues to 607 where the tiles of the batch are entered into the ECD FIFO. Flow continues to 608 where the process for the batch ends, but may be repeated for additional batches.

Figure 7:
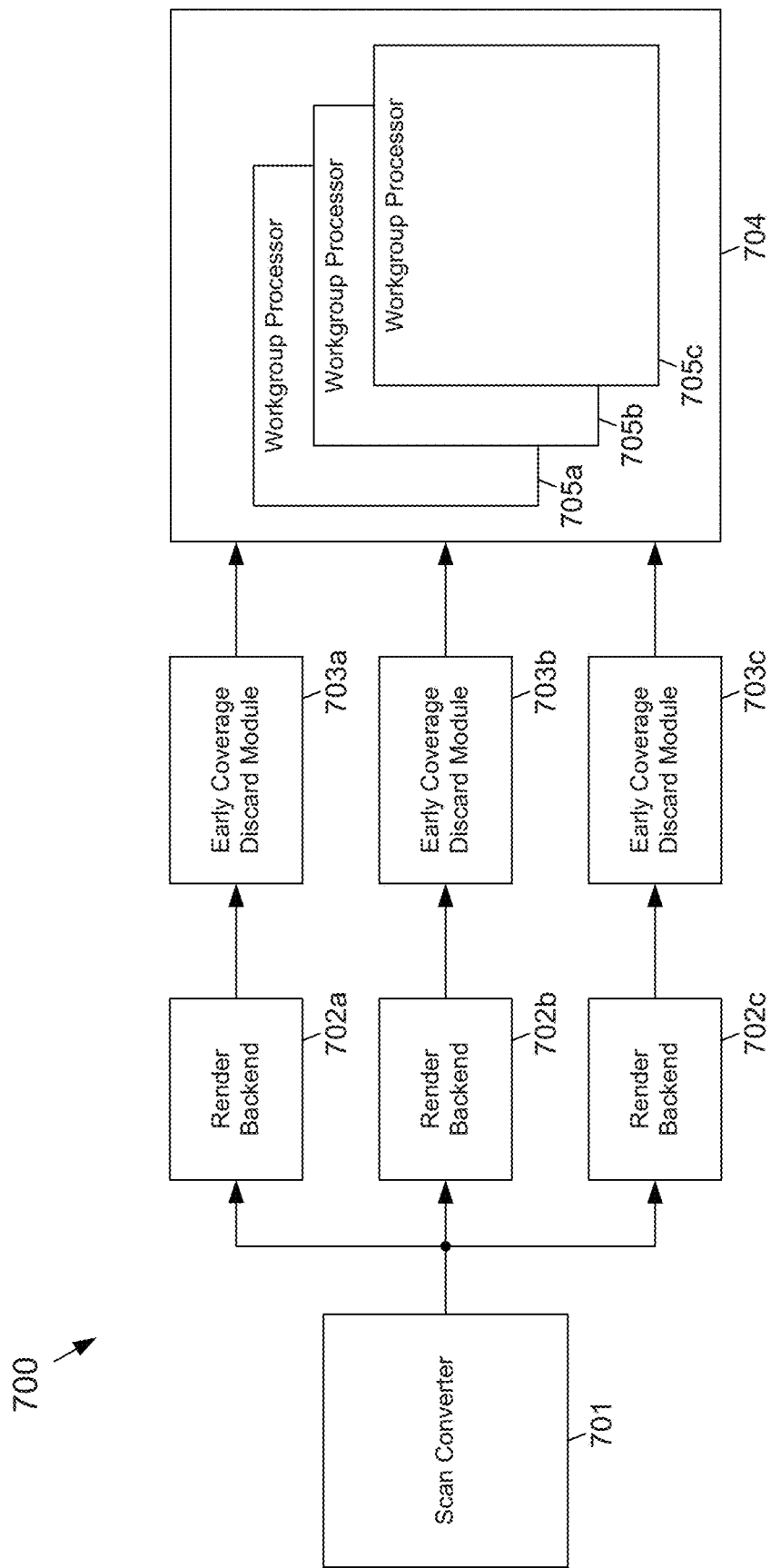
FIG. 7 depicts an example high-level GPU architecture in which the subject matter disclosed herein may be used.

FIG. 7 depicts an example high-level GPU architecture 700 in which the subject matter disclosed herein may be used. The GPU architecture may include a scan converter 701, render backends 702a-702c, early coverage discard modules 703a-703c, and shaders 704, which may, for example, include workgroup processors 705a-705c. Signal flow may be as indicated by arrows. The early coverage discard modules 703a-703c may provide the opportunistic bypass and/or the dynamic queue resizing functionality as disclosed herein. As modules, the early coverage discard modules 703a-703c may be any combination of software, firmware and/or hardware configured to provide the functionality described herein in connection with the early coverage discard modules. Software, for example, may be embodied as a software package, code and/or instruction set or instructions, and hardware may include, for example, singly or in any combination, an assembly, hardwired circuitry, programmable circuitry, state machine circuitry, and/ or firmware that stores instructions executed by programmable circuitry. It should be understood that the GPU architecture 700 may include other components and functional that is not shown in FIG. 7.

Figure 8:
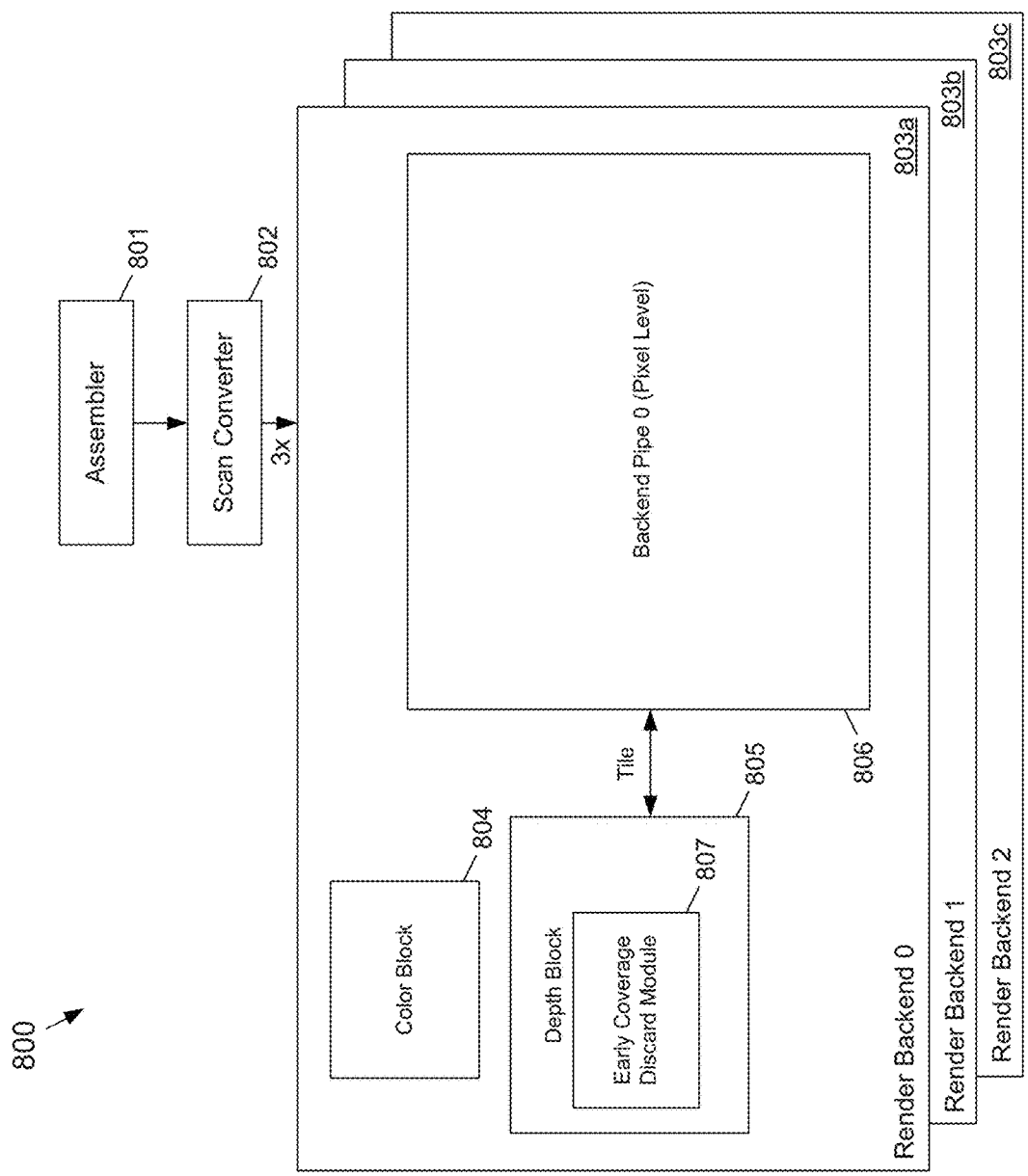
FIG. 8 depicts another example high-level GPU architecture in which the subject matter disclosed herein may be used.

FIG. 8 depicts another example high-level GPU architecture 800 in which the subject matter disclosed herein may be used. The GPU architecture 800 may include an assembly 801, a scan converter 802, and one or more render backends 803a-803c. A render back end 803 may include a color block 804, a depth block 805 and a backend pipe 806. The depth block may include an early coverage discard module 807. Signal flow may be as indicated by arrows. The early coverage discard module 807 may provide the opportunistic bypass and/or the dynamic queue resizing functionality as disclosed herein. As a module, the early coverage discard module 807 may be any combination of software, firmware and/or hardware configured to provide the functionality described herein in connection with the early coverage discard modules. Software, for example, may be embodied as a software package, code and/or instruction set or instructions, and hardware may include, for example, singly or in any combination, an assembly, hardwired circuitry, programmable circuitry, state machine circuitry, and/or firmware that stores instructions executed by programmable circuitry. The color block and the depth block may also be embodied as modules. It should be understood that the GPU architecture 800 may include other components and functional that is not shown in FIG. 8.

Figure 9:
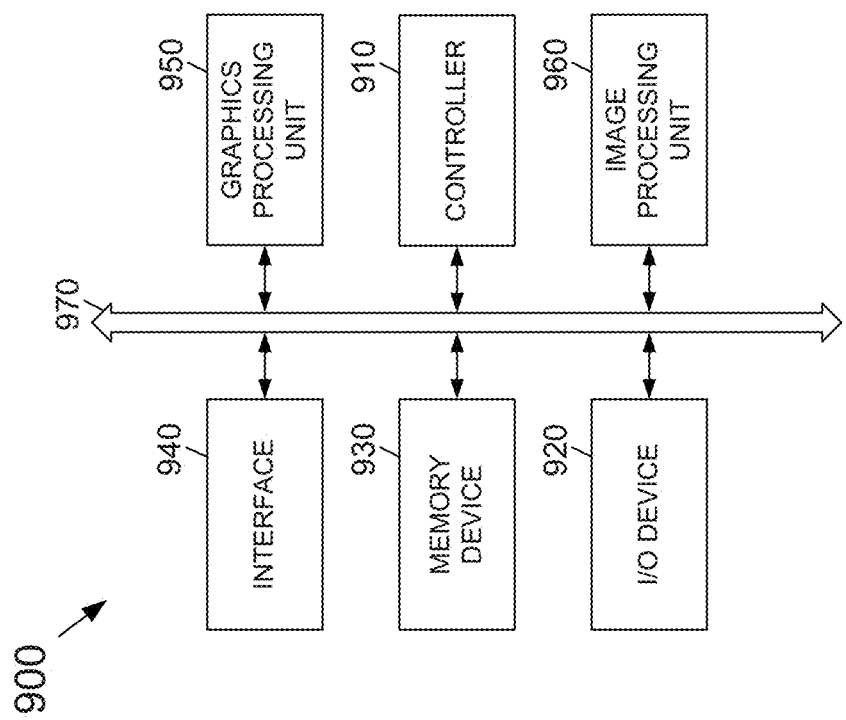
FIG. 9 depicts an electronic device that includes a GPU that may include opportunistic bypass and/or dynamic queue resizing functionality according to the subject matter disclosed herein.

FIG. 9 depicts an electronic device 900 that includes a GPU that may include opportunistic bypass and/or dynamic queue resizing functionality according to the subject matter disclosed herein. Electronic device 900 may be used in, but not limited to, a computing device, a personal digital assistant (PDA), a laptop computer, a mobile computer, a web tablet, a wireless phone, a cell phone, a smart phone, a digital music player, or a wireline or wireless electronic device. The electronic device 900 may include a controller 910, an input/output device 920 such as, but not limited to, a keypad, a keyboard, a display, a touch-screen display, a camera, and/or an image sensor, a memory 930, an interface 940, a GPU 950, and an imaging-processing unit 960 that are coupled to each other through a bus 970. The GPU 950 may include opportunistic bypass and/or dynamic queue resizing functionality according to the subject matter disclosed herein. The controller 910 may include, for example, at least one microprocessor, at least one digital signal processor, at least one microcontroller, or the like. The memory 930 may be configured to store a command code to be used by the controller 910 or a user data.

Electronic device 900 and the various system components of electronic device 900 may include the image processing unit 960. The interface 940 may be configured to include a wireless interface that is configured to transmit data to or receive data from a wireless communication network using a RF signal. The wireless interface 940 may include, for example, an antenna. The electronic system 900 also may be used in a communication interface protocol of a communication system, such as, but not limited to, Code Division Multiple Access (CDMA), Global System for Mobile Communications (GSM), North American Digital Communications (NADC), Extended Time Division Multiple Access (E-TDMA), Wideband CDMA (WCDMA), CDMA2000, Wi-Fi, Municipal Wi-Fi (Muni Wi-Fi), Bluetooth, Digital Enhanced Cordless Telecommunications (DECT), Wireless Universal Serial Bus (Wireless USB), Fast low-latency access with seamless handoff Orthogonal Frequency Division Multiplexing (Flash-OFDM), IEEE 802.20, General Packet Radio Service (GPRS), iBurst, Wireless Broadband (WiBro), WiMAX, WiMAX-Advanced, Universal Mobile Telecommunication Service—Time Division Duplex (UMTS-TDD), High Speed Packet Access (HSPA), Evolution Data Optimized (EVDO), Long Term Evolution—Advanced (LTE-Advanced), Multichannel Multipoint Distribution Service (MMDS), Fifth-Generation Wireless (5G), and so forth.

Embodiments of the subject matter and the operations described in this specification may be implemented in digital electronic circuitry, or in computer software, firmware, or hardware, including the structures disclosed in this specification and their structural equivalents, or in combinations of one or more of them. Embodiments of the subject matter described in this specification may be implemented as one or more computer programs, i.e., one or more modules of computer-program instructions, encoded on computer-storage medium for execution by, or to control the operation of, data-processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer-storage medium can be, or be included in, a computer-readable storage device, a computer-readable storage substrate, a random or serial-access memory array or device, or a combination thereof. Moreover, while a computer-storage medium is not a propagated signal, a computer-storage medium may be a source or destination of computer-program instructions encoded in an artificially-generated propagated signal. The computer-storage medium can also be, or be included in, one or more separate physical components or media (e.g., multiple CDs, disks, or other storage devices). Additionally, the operations described in this specification may be implemented as operations performed by a data-processing apparatus on data stored on one or more computer-readable storage devices or received from other sources.

While this specification may contain many specific implementation details, the implementation details should not be construed as limitations on the scope of any claimed subject matter, but rather be construed as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described herein. Other embodiments are within the scope of the following claims. In some cases, the actions set forth in the claims may be performed in a different order and still achieve desirable results. Additionally, the processes depicted in the accompanying figures do not necessarily require the particular order shown, or sequential order, to achieve desirable results. In certain implementations, multitasking and parallel processing may be advantageous.

As will be recognized by those skilled in the art, the innovative concepts described herein may be modified and varied over a wide range of applications. Accordingly, the scope of claimed subject matter should not be limited to any of the specific exemplary teachings discussed above, but is instead defined by the following claims.

What is claimed is:

1. A method to reduce overdraw of primitives in a graphics processing unit (GPU), the method comprising:
   determining, in a pipeline stage of the GPU, an occlusion index (OI) for a first tile of one or more tiles of a batch of graphical data, each tile comprising one or more blocks of graphical data;
   entering masks into an early coverage discard (ECD) first-in, first-out (FIFO) memory in a depth unit of the GPU based on the OI for the first tile being greater than a first threshold value, each mask corresponding to a primitive of the first tile and each primitive being represented in a corresponding mask by element values of the mask, a first primitive represented in a first mask being evaluated with respect to a second primitive represented in a second mask that is entered into the ECD FIFO memory after the first mask, and element values of the first mask being changed based on the second primitive occluding the first primitive; and
   bypassing the blocks of the first tile from the ECD FIFO memory based on the OI for the first tile being less than the first threshold value.

2. The method of claim 1, wherein the OI for the first tile comprises an overdraw rate for the first tile based on a predetermined resolution of graphical data of the first tile.

3. The method of claim 2, wherein the predetermined resolution of graphical data comprises a sample level, a 2×2 block level, a quad level, an 8×8 block level, or a tile level.

4. The method of claim 1, wherein the first threshold value is based on a batch size, a tile size, an ECD FIFO memory size, or a benchmark information for an application being processed by the GPU.

5. The method of claim 1, further comprising bypassing the blocks of the first tile from the ECD FIFO memory based on the OI for the first tile being greater than a second threshold value, the second threshold value being greater than the first threshold value.

6. The method of claim 5, wherein the second threshold value is based on a batch size, a tile size, an ECD FIFO memory size, a benchmark information for an application being processed by the GPU, or architecture latency sensitivity of the GPU.

7. The method of claim 5, further comprising changing a queue length for the first tile in the ECD FIFO memory based on the OI for the first tile being greater than the first threshold value and less than or equal to a third threshold value, the third threshold value being greater than the first threshold value and less than the second threshold value.

8. The method of claim 7, wherein the third threshold value is based on a batch size, a tile size, an ECD FIFO memory size, or a benchmark information for an application being processed by the GPU.

9. A method to reduce overdraw of primitives in a graphics processing unit (GPU), the method comprising:
   determining, in a pipeline stage of the GPU, an occlusion index (OI) for a first tile of one or more tiles of a batch of graphical data, each tile comprising one or more blocks of graphical data;
   entering masks into an early coverage discard (ECD) first-in, first out (FIFO) memory in a depth unit of the GPU based on the OI for the first tile being greater than a first threshold value, each mask corresponding to a primitive of the first tile and each primitive being represented in a corresponding mask by element values of the mask, a first primitive represented in a first mask being evaluated with respect to a second primitive represented in a second mask that is entered into the ECD FIFO memory after the first mask, and element values of the first mask being changed based on the second primitive occluding the first primitive; and
   changing a queue length of the ECD FIFO memory for the first tile based on the OI for the first tile being greater than the first threshold value and less than a second threshold value, the second threshold value being greater than the first threshold value.

10. The method of claim 9, further comprising bypassing blocks of the first tile from the ECD FIFO memory based on the OI for the first tile being less than the first threshold value.

11. The method of claim 10, wherein the OI for the first tile comprises an overdraw rate for the first tile based on a predetermined resolution of graphical data of the first tile.

12. The method of claim 11, wherein the predetermined resolution of graphical data comprises a sample level, a 2×2 block level, a quad level, an 8×8 block level, or a tile level.

13. The method of claim 10, further comprising bypassing blocks of the first tile from the ECD FIFO memory based on the OI for the first tile being greater than a third threshold value, the third threshold value being greater than the second threshold value.

14. A depth unit for a graphics processing unit (GPU), the depth unit comprising:
   an early coverage discard (ECD) first-in, first-out (FIFO) memory; and
   a comparator that compares an occlusion index (OI) for a first tile against a first threshold value, the first tile comprising one of one or more tiles of a batch of graphical data,
   the depth unit being configured to bypass blocks of the first tile from the ECD FIFO memory based on the OI for the first tile being less than the first threshold value and enter masks into the ECD FIFO memory based on the OI for the first tile being greater than the first threshold value, each mask corresponding to a primitive of the first tile and each primitive being represented in a corresponding mask by element values of the mask, a first primitive represented in a first mask being evaluated with respect to a second primitive represented in a second mask that is entered into the ECD FIFO memory after the first mask, and element values of the first mask being changed based on the second primitive occluding the first primitive.

15. The depth unit of claim 14, wherein the comparator is configured to compare the OI for the first tile against a second threshold value that is greater than the first threshold value, and wherein the depth unit is configured to bypass blocks of the first tile from the ECD FIFO memory based on the OI for the first tile being greater than the second threshold value.

16. The depth unit of claim 14, wherein the comparator is configured to compare the OI for the first tile against a second threshold value that is greater than the first threshold value, and
   wherein the depth unit is configured to change a queue length of the ECD FIFO memory for blocks of the first tile based on the OI for the first tile being less than the second threshold value.

17. The depth unit of claim 14, wherein the OI for the first tile comprises an overdraw rate for the first tile based on a predetermined resolution of graphical data of the first tile, and wherein the predetermined resolution of graphical data comprises a sample level, a 2×2 block level, a quad level, an 8×8 block level, or a tile level.

* * * * *